United States Patent [19]

Winter

[11] Patent Number: 4,765,999

[45] Date of Patent: Aug. 23, 1988

[54] POLYESTER/COPOLYESTER COEXTRUDED PACKAGING FILM

[75] Inventor: John P. Winter, Appleton, Wis.

[73] Assignee: Presto Products, Incorporated, Appleton, Wis.

[21] Appl. No.: 759,391

[22] Filed: Jul. 26, 1985

[51] Int. Cl.⁴ .................. B65B 29/08; B65D 81/34; A23L 1/18; B32B 27/08

[52] U.S. Cl. .................. 426/113; 426/107; 426/118; 426/127; 426/234; 426/410; 426/412; 428/35; 428/347; 428/480; 428/483; 428/349; 428/481; 264/171; 525/444

[58] Field of Search ............... 426/127, 111, 107, 113, 426/118, 234, 410, 412; 428/35, 347, 480, 412, 483, 349, 481; 264/171

[56] References Cited

U.S. PATENT DOCUMENTS

| | | | |
|---|---|---|---|
| 2,265,075 | 12/1941 | Knuetter | 93/35 |
| 2,821,337 | 1/1958 | Morgan, Jr. | 229/57 |
| 2,823,421 | 2/1958 | Scarlett | 18/57 |
| 2,978,769 | 4/1961 | Harrah | 24/201 |
| 3,003,681 | 10/1961 | Orsini | 229/57 |
| 3,017,069 | 1/1962 | Kardon et al. | 229/57 |
| 3,079,065 | 2/1963 | Kessler | 229/57 |
| 3,136,475 | 6/1964 | Geimer | 229/57 |
| 3,143,277 | 8/1964 | Fleur | 229/57 |
| 3,203,621 | 8/1965 | Wright | 229/62 |
| 3,220,635 | 11/1965 | Kasting et al. | 299/57 |
| 3,223,761 | 12/1965 | Raley | 264/95 |
| 3,277,798 | 10/1966 | Krauss | 93/35 |
| 3,337,914 | 8/1967 | Corbett et al. | 18/13 |
| 3,338,285 | 8/1967 | Jaster | 150/3 |
| 3,343,663 | 9/1967 | Seidler | 206/46 |
| 3,381,886 | 5/1968 | Goglio | 229/57 |
| 3,389,783 | 6/1968 | Bjorkengren | 206/46 |
| 3,437,258 | 4/1969 | Kugler | 229/58 |
| 3,467,565 | 9/1969 | Utz | 156/244 |
| 3,476,627 | 11/1969 | Squires | 156/244 |
| 3,534,520 | 10/1971 | Moran | 53/14 |
| 3,555,604 | 1/1971 | Pahlke | 18/14 |
| 3,558,330 | 9/1971 | Widiger et al. | |
| 3,559,239 | 2/1971 | Work et al. | 18/12 |
| 3,611,492 | 10/1971 | Scheibling | 18/13 P |
| 3,851,574 | 12/1974 | Katz | 426/107 |
| 3,922,440 | 11/1975 | Wegwerth et al. | 428/437 |
| 3,925,591 | 12/1975 | Breitenfellner et al. | |
| 3,973,045 | 8/1976 | Brandberg et al. | 426/110 |
| 4,105,118 | 8/1978 | Williams, Jr. et al. | 206/524.2 |
| 4,119,479 | 10/1978 | Williams, Jr. et al. | 156/272 |
| 4,141,736 | 2/1979 | Canty | 96/87 R |
| 4,175,147 | 11/1979 | Bollen et al. | 428/35 |
| 4,178,401 | 12/1979 | Weinberg et al. | 428/35 |
| 4,188,443 | 2/1980 | Mueller et al. | |
| 4,207,363 | 6/1980 | Lustig et al. | 428/35 |
| 4,264,662 | 4/1981 | Taylor et al. | 428/40 |
| 4,310,370 | 1/1982 | Arai | 156/220 |
| 4,316,070 | 2/1982 | Prosise et al. | 219/10.55 E |
| 4,327,174 | 4/1982 | VonMeer | 430/530 |
| 4,375,494 | 3/1983 | Stokes | 428/323 |
| 4,386,124 | 5/1983 | Akao | 428/35 |
| 4,389,438 | 6/1983 | Ohtsuki et al. | 428/35 |

(List continued on next page.)

FOREIGN PATENT DOCUMENTS 49-005187 1/1974 Japan.

OTHER PUBLICATIONS

Modern Plastics Encyclopedia vol. 48#10A 10/71 p. 62 plus.

Modern Packaging Encyclopedia vol. 44#7A 7/71 p. 134+.

Eastman Plastics Technical Report TR-62, dated Oct. 1983.

Eastman Plastics Tentative Data dated Mar. 22, 1982.

Eastman Plastics Material Bulletin MB-58D dated Mar. 1978.

Primary Examiner—Steven Weinstein
Attorney, Agent, or Firm—Willian Brinks Olds Hofer Gilson & Lione Ltd.

[57] ABSTRACT

Multiple layer nonoriented heat sealable films are disclosed having a base substrate layer of poly(ethylene terephthalate) (polyester) or polyester copolymer and at least one heat sealable surface layer of a copolyester. The films are prepared by conventional cast or blown film coextrusion techniques.

52 Claims, 2 Drawing Sheets

U.S. PATENT DOCUMENTS

| | | | |
|---|---|---|---|
| 4,389,450 | 6/1983 | Schaefer et al. | 428/212 |
| 4,389,472 | 1/1983 | Neuhaus | 430/10 |
| 4,393,088 | 7/1983 | Matsusaka | 426/234 |
| 4,399,182 | 8/1983 | Brown et al. | 428/215 |
| 4,403,934 | 9/1983 | Rasmussen et al. | 425/192 R |
| 4,405,547 | 9/1983 | Koch et al. | 264/171 |
| 4,421,580 | 12/1983 | Dembicki et al. | 156/69 |
| 4,421,809 | 12/1983 | Bish | 428/90 |
| 4,450,180 | 5/1984 | Watkins | 426/107 |
| 4,452,846 | 6/1984 | Akao | 428/220 |
| 4,465,449 | 8/1984 | Hornbeck | 425/131.1 |
| 4,469,754 | 9/1984 | Hoh et al. | 428/476.3 |
| 4,482,593 | 11/1984 | Sagel et al. | 428/90 |
| 4,483,812 | 11/1984 | Hahn et al. | 264/171 |
| 4,484,883 | 11/1984 | Honda et al. | 425/462 |
| 4,515,840 | 5/1985 | Gatward | 428/35 |
| 4,571,337 | 2/1986 | Cage et al. | 426/107 |

POLYESTER/COPOLYESTER COEXTRUDED PACKAGING FILM

BACKGROUND AND SUMMARY OF THE INVENTION

The present invention relates to packaging films. Specifically, the present invention relates to multiple layer heat sealable packaging films.

Biaxially oriented polyethylene terephtlatate, commonly referred to as "oriented polyester" or "OPET", is a common packaging film with over 200 million lbs. used annually. However, an important criteria for any packaging film is its ability to be heat sealed to itself as well as to other substrates. OPET films are not heat sealable. In recent years, however, heat sealable OPET has become commercially available incorporating amorphous homopolymers or copolymers of PET as heat sealants applied either as a coating or coextrusion. OL Mylar is an example of a heat sealable OPET film having the heat sealants applied as a coating. OL Mylar is a registered trademark of E.I. DuPont de Nemours and Company. Melinex 850 is an example of a heat sealable OPET film having the heat sealants applied as a coextrusion. Melinex is a registered trademark of Imperial Chemical Industries, Ltd.

Recently, heat sealable OPET films have been used as the inside layer of a paper-film laminated bag for cooking popcorn and other foodstuffs in a microwave oven. Microwave popcorn bags are described in U.S. Pat. Nos. 3,973,045 and 4,450,180. However, the bags of these inventions do not contain an inside film liner, rather they consist of two plys of paper. Typically, the outer ply is a bleached Kraft paper, while the inner ply is a greaseproof paper such as glassine. These bags are intended for a frozen product in which the bag is filled with the popcorn cooking oil mixture and then frozen. The product is shipped and stored frozen.

In recent years, "shelf stable" products such as microwave popcorn bags have been introduced. These products do not require any refrigeration. However, the greaseproof paper lined bag used for the frozen product was not adequate for the shelf stable product in that the cooking oil in the unfrozen state would leak through and stain the outer paper liner. This problem was eliminated by changing the inner ply to a plastic film. In particular, heat sealable OPET films are used as the inner ply of the shelf stable bag. An example of this product is Orville Redenbacher's Gourmet Microwave Popping Corn. Orville Redenbacher's and Gourmet are registered trademarks of the Beatrice Companies, Inc.

OPET films are manufactured by an orientation process utilizing tenter frame or "double bubble" techniques. Tentering of plastic films is illustrated in U.S. Pat. No. 2,823,421 and double-bubble orientation is illustrated in U.S. Pat. No. 3,555,604. U.S. Pat. Nos. 4,141,736 and 4,207,363 describes oriented films made using the tenter and double bubble processes, respectively. The orientation process comprises the steps of (1) extruding a thick web and cooling to a solid state; (2) precise reheating of film to the "orientation" temperature, (3) stretching the film in both longitudinal and transverse directions, and (4) reheating film to relieve internal stresses. Melinex 850 comprises two layers coextruded in step (1) of the orientation process prior to reheating to the orientation temperature. An example of a coextruded oriented PET is disclosed in U.S. Pat. No. 4,375,494. This heat sealant oriented PET differs from the films of this invention in that the film is oriented.

Alternatively, monolayer OPET can be made heat sealable by laminating it to a heat sealant film. This lamination is done in a separate manufacturing operation. Typically the heat sealant is an olefinic film such as polyethylene. An example of such a lamination is disclosed in U.S. Pat. No. 4,178,401.

The film disclosed herein consists of a base substrate layer "B" coextruded with one or two heat seal surface layers "A" yielding either an "AB" or "ABA" multiple layer film. The film can be produced by conventional blown or cast coextrusion techniques.

Conventional blown film coextrusion techniques and equipment therefor is known in the art and is commercially available. Also, conventional cast film coextrusion techniques and equipment therefor is known in the art and is commercially available. The following U.S. patents disclose various coextrusion extrusion techniques and equipment therefor: U.S. Pat. Nos. 4,484,883; 4,483,812; 4,465,449; 4,405,547; 4,403,934; 3,611,492; 3,559,239; 3,476,627; 3,337,914; 3,223,761 and 3,467,565.

Two conventional cast coextrusion techniques are known in the art. The first method combines the molten polymers in a combining adaptor prior to entering the slot cast die. The second method does not bring the molten polymers in contact with each other, until the polymer melt streams are inside the die. Either method will yield a cast coextruded film with very similar properties.

The base layer "B" comprises polyester and/or copolyester. Polyester is defined herein as poly(ethylene terephthalate) which is typically made by reacting terephthalic acid with ethylene glycol. Other acids or glycols can be used. Copolyesters are made by reacting more than one acid or glycol.

This "B" layer imparts the physical strength of the film, i.e., toughness, tear resistance, stiffness, etc., as well as the thermal resistance. The base layer comprises 50%–99% mil/mil of the total film thickness, preferably 75%–95% mil/mil.

The heat sealant layer "A" comprises a copolyester. This copolyester is not the same copolyester utilized in the "B" layer. This can be utilized in the "B" layer provided same is not utilized in the heat sealant layer. This copolyester will typically have a lower softening-/melting temperature than the "B" layer. This property enables the "A" layer to provide strong heat seals over a broad range of temperatures.

The "A" layer promotes a heat seal when the film is heat sealed to (1) the "A" or "B" layer of film, or (2) other films or rigid substrates. The heat seal is accomplished by applying heat and pressure against the film and substrate. An example of a heat seal is that found on packages of snack foods or the bottom of a plastic trash bag. The heat seal can be either peelable or fused.

Optionally, the heat seal layer "A" may contain slip and antiblock agents to lower the coefficient of friction, C.O.F., of the film as well as to prevent roll blocking. Low C.O.F. (0.2–0.5 g) is often necessary to enable the film to "slide through" various converting machinery.

The "A" layer or layers comprises 1%–50% mil/mil of the total film thickness, preferably 5%–25% mil/mil. The composition of the polymers in "A" are a polyester or copolyester resin or blend thereof using compatible polymers.

FIG. 3 illustrates an adhesive lamination of films of the invention to paper.

The total thickness of the film is from 0.5 to 5 mil (0.0005–0.005 inches) preferably 0.5 to 2 mil (0.0005–0.002 inches).

The present invention provides compositions of nonoriented multiple layer heat sealable films which can be used in many packaging applications where heat seal OPET films are used. The nonoriented multiple layer heat sealable films of the present invention are manufactured by conventional cast or blown film nonorienting coextrusion techniques.

Conventional film coextrusion equipment costs substantially less than orientation equipment and is significantly easier and less expensive to operate. Those skilled in the art can appreciate the significance of producing a nonoriented film which can be used to replace an oriented film.

Nonoriented single layer PET films are well known, An example is disclosed in U.S. Pat. No. 4,175,147. This patent discloses single layer nonoriented films comprised of 97.5% to 99.9% w/w of PET blended with 2.5 to 0.1% of polycarbonate. Nonoriented multilayer film wherein one layer includes PET is disclosed in U.S. Pat. No. 4,389,450. This patent discloses a multiple layer heat sealable packaging sheet. The base layer (nonsealant) layer can comprise of a blend of 75% polyester and 25% olefinic material (e.g., ethylene acrylic acid, ethylene methyl acrylate, ethylene ethyl acrylate, ionomer, and the like). The heat sealant layer is selected from the same group of olefinic polymers. The films of this invention differ in that they contain non-olefinic heat sealants (polyesters and copolyesters) and the base layers do not contain any olefinic polymers. Nonoriented heat sealable films are also disclosed in U.S. Pat. No. 4,469,754. This patent discloses olifinic compositions intended for heat sealant layers in coextrusions, coatings and laminations. The benefits of a broad heat seal range in packaging films are discussed.

The present invention demonstrates the following additional advantages over heat sealable OPET films: (1) the films of the present invention have better surface receptivity to inks, adhesives, and the like; (2) the films of the present invention exhibit superior heat seal properties; (3) the films of the present invention are thermoformable; and (4) "AB" films of the present invention are lap sealable to themselves. Such additional advantages are a result of the relatively amorphous nature of the nonoriented films of this invention compared to the relatively crystalline nature of the OPET films.

The present invention provides film compositions which can be used in place of heat sealable OPET film in extremely demanding applications such as microwave popcorn bags.

It is an object of the present invention to provide compositions of nonoriented multiple layer heat sealable films having many of the important properties of heat sealable OPET films.

It is another object of the present invention to provide nonoriented multiple layer heat sealable films manufactured by conventional cast or blown film nonorienting coextrusion techniques.

It is a further object of the present invention to provide nonoriented multiple layer neat sealable films having the following advantages over heat sealable OPET films: (1) better surface receptivity to inks, adhesives and the like; (2) superior heat seal properties; (3) thermoformability; and (4) lap sealability of "AB" films.

It is a further object of the present invention to provide nonoriented multiple layer heat sealable films which can be utilized as an inside liner of a laminate bag such as a microwave popcorn bag produced by laminating the film as the inside plastic film liner to a paper layer and forming the bag from the resulting laminate.

These and other objects of the present invention will be apparent from the description of the preferred embodiments which follows. Such objects are not intended to limit the scope of the present invention.

DETAILED DESCRIPTION OF THE PREFERRED EMBODIMENTS

Figure 1:
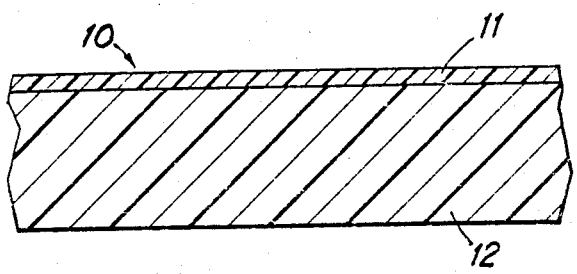
FIG. 1 illustrates a multilayer film of the present invention with heat sealant layer on one side, "AB" film.

The invention in its simplest form is exemplified in FIG. 1 in which a two-layer film is generally designated 10. Layer 11 of film 10 is a heat sealant layer "A" consisting of copolyester resin. Layer 12 of film 10 is the base layer "B" consisting of different polyester and/or copolyester polymers.

Figure 2:
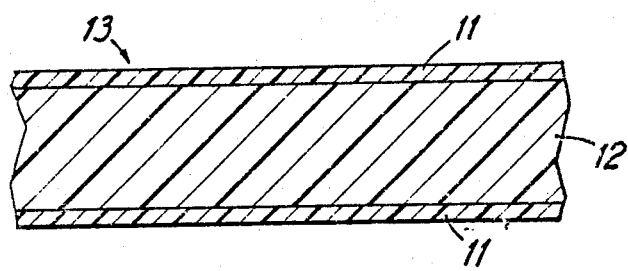
FIG. 2 illustrates a multilayer film of the present invention with heat sealant layers on both external sides, "ABA" film.

FIG. 2 illustrates an alternate construction in which a three-layer film is generally designated 13. In this form, the base layer 12 "B" is sandwiched between the heat sealant layers 11 "A".

In both structures, the purpose of layer 11 is to serve as a heat sealant layer when the film is sealed to itself or a second substrate. In both films 10 and 13, the function of layer 12 is generally that of providing the primary strength and toughness of the film.

Optionally, the heat seal layer "A" may contain slip and antiblock agents to lower the coefficient of friction, C.O.F., of the film as well as to prevent roll blocking. Low C.O.F. (0.2–0.5 g) is often necessary to enable the film to "slide through" various converting machinery.

The base layer "B" determines the film's physical properties. As discussed earlier, the polymers used for this layer consist of either (1) a polyester; (2) a copolyester; or (3) a blend of a polyester and copolyester. Use of a polyester will result in the least expensive base layer. However, the film with a polyester base layer will not be as strong as that obtained with a copolyester or polyester/copolyester blend.

The copolyester selected for the heat sealant layer "A" will determine the heat seal properties of the film. There are many different kinds of copolyesters polymers commercially available. By utilizing different glycols and/or acids to react with terephthalic acid, different copolyester resins are obtained.

The invention and effect of polymer selection is illustrated by the following examples.

EXAMPLE 1

A base layer "B" consisting of a polyester polymer was coextruded with a PETG copolyester. The PETG utilized was produced by reacting terephthalic acid, ethylene glycol and 1,4-cyclohexanedimethanol. This copolyester can be chemically defined as poly (ethylene-1,4-cyclohexylene-dimethylene terephthalate). One commercial PETG copolyester of this formulation is Kodar 6763 manufactured by Eastman Chemical Products, Inc. Kodar is a registered trademark of Eastman Chemical Products, Inc. The base layer resin was placed into a first extruder and the heat sealant resin was placed in a second extruder and the resins were coextruded through a feedblock and cast film die and then quenched on a chilled roll. The resultant film had a total thickness of 0.7 mil (0.0007 inches) of which 0.6 mil was the polyester base layer and 0.1 mil was the PETG copolyester heat sealant layer.

EXAMPLE 2

The film of example 1 except that a PCTA copolyester was used as the base layer "B". The PCTA utilized was a copolyester produced by reacting terephthalic acid, isophtalic acid and 1,4- cyclohexanedimethanol. This copolyester can be chemically defined as poly (1,4-cyclohexylene-dimethylene terephthalate-co-isophthalate). One commercial PCTA of this formulation is Kodar A150 manufactured by Eastman Chemical Products, Inc. Kodar is a registered trademark of Eastman Chemical Products, Inc.

EXAMPLE 3

The film of example 1 except that a different PETG copolyester was used for the heat sealant layer. The copolyester used was produced by utilizing diethylene glycol as the "second" glycol in the polymerization. This copolyester can be chemically defined as poly (ethylene-co-diethylene terephthalate). One commercial copolyester of this formulation is Kodabond 5116 manufactured by Eastman Chemical Products, Inc. Kodabond is a registered trademark of Eastman Chemical Products, Inc.

Hereinafter this PETG will be referred to as "diethylene glycol copolyester."

Table 1 contains physical properties of the films of examples 1-2 and demonstrates the effect of changing the base layer from a polyester to PCTA copolyester. Note that the film with the polyester based layer (example 1) has lower tensile, elongation and tear strength. The PCTA copolyester base film is a tougher and less tear resistant film which can be important properties in many packaging applications.

Table 2 lists seal strength properties of films from examples 1 and 3 which contain the same base layer (polyester) but different heat sealant layers. Note that the film with the diethylene glycol copolyester heat sealant (example 3) has a broader sealing latitude (range).

TABLE 1

|  | Example 1 | Example 2 |
|---|---|---|
| ULTIMATE Tensile ASTM D882 (psi) | 7300 | 5700 |
| Ultimate Elongation ASTM D882 (%) | 188 | 5 |
| Tear ASTM D1922 (g) | 20 | 18 |

TABLE 2

Tensile strength of heat seals made at 40 psi, 0.5 sec. dwell (g/inch).

| Seal Temperature (F.) | Example 1 | Example 3 |
|---|---|---|
| 250° F. | 1248 | 522 g |
| 300° F. | 2043 | 980 g |
| 325° F. | 2050 | 1153 g |
| 350° F. | 2088 | 1353 g |
| 375° F. | 2090 | 1457 g |
| 400° F. | 2090 | 1530 g |
| 450° F. | 2090 | 1630 g/in |

"AB" film of the present invention is lap sealable to itself which provides an additional advantage over heat sealable OPET films. For example, bag lap seals are more aesthetic than fin seals. A lap seal is formed when a film overlaps onto itself and a seal is formed between the film and an overlaping section of the film. A fin seal is formed between two nonoverlaping sections of film. Fin seals have a fin-like shape and are known in the art. Lap seals are also known in the art.

EXAMPLE 4

A base layer "B" comprised of the PCTA copolyester used in example 2 was coextruded with the diethylene glycol copolyester of example 3 as the "A" heat seal layer. The "A" heat seal layer contained an organic silicone slip agent and an inorganic diatomaceous earth antiblock agent. The base layer B was 0.6 mil in thickness and the sealant layer A was 0.1 mil.

EXAMPLE 5

A base layer resin "B" comprised of polyester was placed into a first extruder and a heat sealant layer resin "A" comprised of diethylene glycol copolyester was placed into a second extruder. The resins were coextruded through an "ABA" feedblock and cast film die and then quenched on a chilled roll. The resultant film had a total thickness of 0.7 mil (0.0007 inches) of which 0.5 mil was the polyester base layer "B" sandwiched by two 0.1 mil heat sealant layers "A". In the preferred coextrusion process of an "ABA" film, the heat sealant layer resin is split into two streams rather than being placed in a third extruder.

Optionally, the films of examples 1-4 can be produced utilizing blown film coextrusion techniques. example 6 below describes the film of example 4 produced utilizing a blown film coextrusion technique.

EXAMPLE 6

Using a 2-layer spiral coextrusion blown film die, the film of example 4 is produced. The base layer "B" polymer is extruded into the outer spiral channel of the die and the heat seal layer "A" polymer is extruded into the inside spiral channel. The 2-layers are combined just prior to the final land of the die and then cooled by conventional blown film techniques.

EXAMPLE 7

Film from example 4 and 50 OL Mylar, (a commercial OPET containing a heat seal coating), were separately used as the inside liner of a laminate bag.

Figure 3:
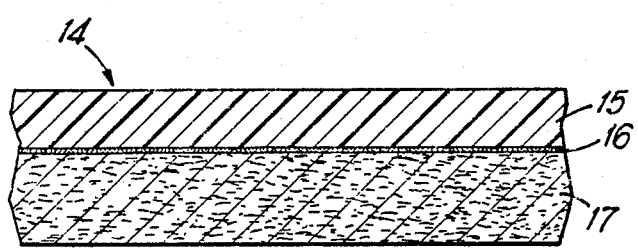
FIG. 3 illustrates an adhesive lamination of films of the present invention to paper.

Referring to FIG. 3, the film 15 was laminated to paper 17 using a laminating adhesive 16. This laminate 14 was subsequently formed into bag 21 depicted in FIG. 3A.

Conventional techniques for adhesively laminating film to paper, film to film and film to other materials is known in the art and adhesives such as glue or the like are commercially available. The following U.S. patents disclose various techniques for adhesively laminating film to paper, film to film and/or film to other materials and the adhesives used in such techniques: U.S. Pat. Nos. 4,515,840; 4,452,846; 4,421,580; 4,399,182; 4,389,438; 4,386,124; 4,264,662; 4,119,479; 4,105,118 and 3,922,440.

Adhesives for laminating film to paper include but are not limited to urethanes and acrylics. Adhesives for laminating film to paper are commercially available from Morton Chemical as well as other commercial sources. U.S. Pat. No. 3,343,663 discloses the use of polyethylene as an adhesive for laminating film to paper. Adhesives for laminating film to film include but are not limited extrudable adhesives, resins and ties. Examples of adhesives for laminating film to film are Plexar and Binel (or CXA). Plexar is a modified polyolefin and a registered trademark of Norchem. Binel (or CXA) comprises copolymers of ethylene having one or more monomers wherein the monomer has a functional group. Binel (or CXA) is a registered trademark of E. I. DuPont de Nemours and Company.

Figures 3A, 3B:
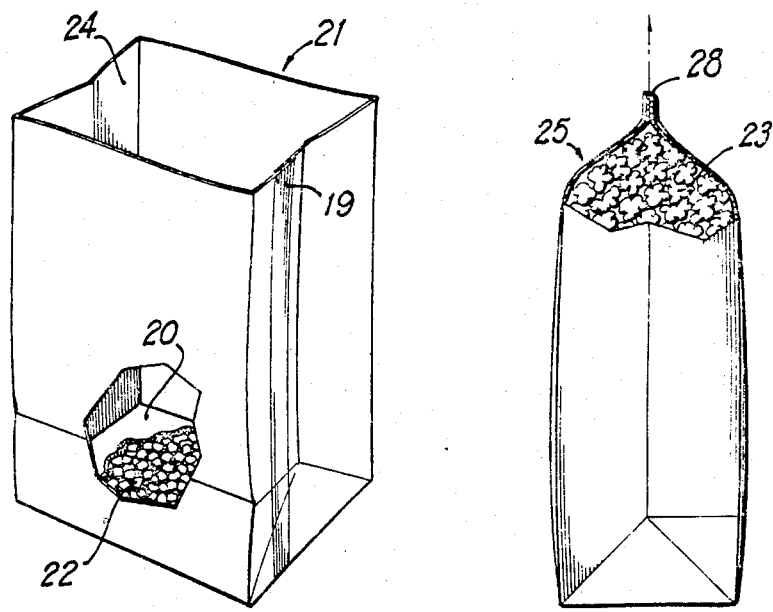
FIGS. 3A and 3B illustrate one type of laminate bag used for microwave popcorn bags and other applications.

FIG. 3A is a schematic of the general bag style made with this laminate. The bag 21 contained a longitudinal seam 19 which consisted of a film to film heat seal and paper to paper glued seal. The bag bottom 20 consisted of various folds, heat seals and glue seals. Consumable food such as popping corn and oil 22 is shown on the bag bottom 20.

This bag style is often referred to as a square bottom bag and can be produced on several commercial bag making machines.

Conventional bag making techniques and equipment therfor is known in the art and is commercially available. Conventional bags include but are not limited to square bottom and pinch bottom bags. The following U.S. patents disclose various bag making techniques and equipment therefor: U.S. Pat. Nos. 3,277,798; 3,220,635; 3,143,277 and 2,265,075.

Figure 4:
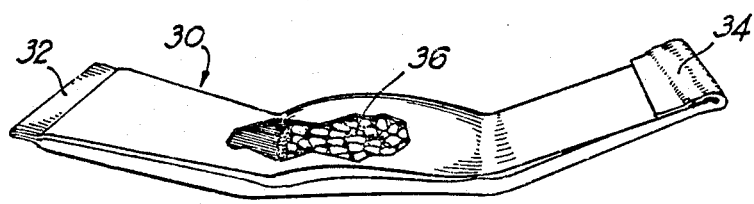
FIG. 4 illustrates a second type of laminate bag used for microwave popcorn bags and other applications.

FIG. 4 is a schematic of different bag style sometimes referred to as a "pinch bottom" style. This pinch bottom bag 30 contains longitudial and end seams 32 and 34 made by film to film heat seals and paper to paper or film to paper glue seals. Consumable such as popping corn and oil 36 is shown disposed inside of the pinch bottom bag 30.

Square bottom bags and pinch bottom bags can be produced to a predetermined size.

Table 3 contains data on the lamination strength of the film to paper as well as the film to film bag seam strengths.

TABLE 3

|  | Lamination Peel Strength g/inch | Bag Seam Strength g/inch |
| --- | --- | --- |
| Example 4 film bags | 726 | 1780 |
| OL Mylar bags | 505 | 937 |

Note that the lamination strength of the coextruded film of Example 4 is 44% stronger than that of the coated polyester. This property exemplifies one inherent advantage of the films of this invention i.e., a natural low surface tension, hence good wetability and lamination strength. Furthermore, when the heat sealant is composed of a diethylene glycol copolyester, significantly superior heat seal properties are obtained. This is exemplified in Table 3 in the bag seam strength data where the bags made from film of example 4 yields a 90% stronger seal.

Table 4 lists heat seal range data of the film of example 4 compared to two commercially available heat sealable OPET films. The seals were of the "fin" type where the heat seal side was sealed to the heat seal side.

TABLE 4

| Heat seal strength for fin seals made at various temperatures sealed at 40 psi, 0.5. sec. dwell (g/in.) | | | |
| --- | --- | --- | --- |
| Seal Temp | Example 4 | OL Mylar | Melinex 850 |
| 250° F. | 522 g/in. | 195 | 267 |
| 300° F. | 980 g/in. | 603 | 500 |
| 325° F. | 1153 g/in. | 725 | 500 |
| 350° F. | 1353 g/in. | 926 | 500 |
| 375° F. | 1457 g/in. | 926 | 500 |
| 400° F. | 1530 g/in. | 926 | 500 |
| 450° F. | 1630 g/in. | 926 | 500 |

In particular, note from Table 4 that the film of example 4 exhibits an increasing seal strength over a 200 F. range (250 F. 450 F.) while the OPET film's seal strength exhibit this temperature-seal strength relationship over much smaller ranges i.e. 100 F. for 50 OL Mylar and 50 F. for Melinex 850. In addition, seals 76% and 226% stronger are obtained at 450 F. with example 4 film compared to 50 OL Mylar and Melinex 850, respectively.

The broad fin heat seal range of the film of example 4 illustrated in Table 4 provides many advantages in packaging applications. In particular, in various converting applications where heat seals are made, the film will have a broader operating window compared to heat sealable OPET's. In other words, the film will be less operator and machine dependent in making acceptable seals.

Table 5 lists additional heat seal data (g/in.) for "lap" seals where the sealant layer was sealed to the non-sealant layer.

TABLE 5

| Seal Temp | Example 4 | OL Mylar | Melinex 850 |
| --- | --- | --- | --- |
| 275° F. | 280 | 227 | 213 |
| 325° F. | 381 | 227 | 213 |
| 375° F. | 418 | 268 | 222 |

The strong lap seals obtained with the film of example 4 provides additional advantage over heat sealable OPET films. For example, bag lap seals are more aesthetic than fin seals.

Another advantage is the ability to obtain "differential" seals with the film of example 4. In other words, a package could have very strong seals on its seams by heat sealing at a temperature at the high end of the film's heat seal temperature range while a weaker, peelable seal could be made at the "top" seam where the package is to be opened by the end user by heat sealing at a temperature at the low end of the film's heat seal temperature range. Differential seals apply to "AB" and "ABA" films of the present invention.

In FIG. 3A, a predetermined amount of consumable food such as popping corn and oil 22 is optionally disposed inside the laminate bag 21 and the open end of the bag 24 is heat sealed closed. When the consumable food 22 is cooked, the bag expands from steam pressure and physical expansion of the consumable food as shown in FIG. 3B. In some cases, this pressure/expansion causes the bag top seal to peel open allowing the steam and pressure to escape. FIG. 3B illustrates the expanded bag 25 and cooked consumable food such as popcorn 23 which applies pressure on top seal 28. The seal 28 is made preferentially weaker than other bag seals to allow for pressure escape and/or ease of opening.

An example of a commercial packaging application wherein the bags of example 7 are utilized is in microwave popcorn bags. Example 8 describes an evaluation of the bags of example 7 in this application.

EXAMPLE 8

100 bags 21 of FIG. 3A, described in example 6 were filled with 74 grams of popping corn and 24 grams of shortening 22. The tops of the bags were then heat sealed. The closed bags having a peelable seal were then "popped" for 3¼ minutes in a 700 watt microwave oven at a microwave oven manufacturer recommended and predetermined power setting for cooking popping corn in the microwave oven and then removed from the microwave oven. Table 6 lists the results of the popping tests.

TABLE 6

| | Seal Leakage (%) | Pop Volume (cc's) |
|---|---|---|
| Bags made with example 4 film | 2% | 2200 |
| Bags made from Dupont OL Mylar | 16% | 2200 |

Note that the bags made from example 4 film exhibited a significantly lower amount of oil (shortening) leakage. This is a result of their 90% stronger seam strength listed in Table 3.

In this application, it is important that the popped bag "self-vents" properly. As the bag 25 fills with popcorn and pressure is built up from the generation of steam, as depicted in FIG. 3B, the top seal 28 will peel open slightly to "vent-off" the steam and pressure. This prevents the popcorn 23 from having a "tough" texture due to saturation with steam. However, self venting must not occur prematurely or the pop volume will be decreased due to lower bag pressure and temperature.

The differential seal properties of the example 4 film play an important role in self-venting. The ability to control the seal strength by varying the seal temperature enables the top seal to be optimized for proper venting and ease of opening the bag after popping. Table 6 shows the pop volume of the bags is comparable as all bags vented properly. In addition, there were no incidences of film burning/holes and all bags vented and opened properly. Summarizing this example, it is clear that the bags made from example 4 film are superior as their differential seal properties provided strong bag seam seals while maintaining bag venting and openability.

EXAMPLE 9

The film of example 5 is utilized to make the laminate bags of example 7 or the laminate bags of FIG. 4.

In addition to their use in the microwave popcorn bag applications, films of this invention can be used for a wide variety of packaging applications. They can be used either alone or as a layer of a lamination or first substrate with a second substrate such as paper or other films. The film of the second substrate is not the same as the first substrate. Examples of some applications include snack food (potato chips, corn chips, etc.) packages, lidding stocks for frozen food trays, cooking pouches, medical pouches for supplies or bag-in-box liquid packaging or the like.

The present invention being thus described, it will be obvious that the same will be varied in many ways. Such variations are not invended as a departure from the spirit or scope of the invention and all such modifications as would be obvious to one skilled in the art are intended to be included within the scope of the following claims.

I claim:

1. A nonoriented, heat sealable, coextruded film not thicker than 2 mil comprising:
    a base layer selected from the group consisting of polyester, copolyester and combinations thereof; and
    a heat sealant layer comprising a copolyester having a melting temperature below that of the base layer.

2. The nonoriented, heat sealable, coextruded film of claim 1 wherein:
    the base layer comprises from about 50% to about 99% mil/mil of the total thickness of the nonoriented, heat sealable, coextruded film; and
    the heat sealant layer comprises from about 1% to about 50% mil/mil of the total thickness of the nonoriented, heat sealable, coextruded film.

3. The nonoriented, heat sealable, coextruded film of claim 2 wherein:
    the base layer comprises from about 75% to about 95% mil/mil of the total thickness of the nonoriented, heat sealable coextruded film; and
    the heat seal layer comprises from about 5% to about 25% mil/mil of the total thickness of the nonoriented, heat sealable film.

4. The nonoriented, heat sealable, coextruded film of claim 2 coextruded by a cast coextrusion technique.

5. The nonoriented, heat sealable, coextruded film of claim 2 coextruded by a blown film coextrusion technique.

6. The nonoriented heat sealable, coextruded film of claim 2 wherein the heat sealant layer contains a slip agent and an antiblock agent.

7. The nonoriented, heat sealable, coextruded film of claim 6 wherein:
    the slip agent is an organic silicone; and
    the antiblock is an inorganic diatomaceous earth.

8. The nonoriented, heat sealant, coextruded film of claim 2 wherein the copolyester of the heat sealant layer is selected from the group consisting of diethylene glycol copolyester and PETG copolyester wherein:
    diethylene glycol copolyester is chemically defined as poly (ethylene-co-diethylene terephthalate); and
    PETG copolyester is chemically defined as poly-(ethylene-1,4-cyclophexylene-dimethylene terephthalate).

9. The nonoriented, heat sealable, coextruded film of claim 2 wherein:
    the base layer comprises PCTA copolyester; and
    PCTA copolyester is chemically defined as poly(1,-4 cyclohexane dimethylene terephthalate-co-isophthalate).

10. The nonoriented, heat sealable, coextruded film of claim 2 wherein the heat sealant layer is differentially sealable utilizing a fusion seal for a strong seal and a peelable seal for a weaker seal.

11. The nonoriented, heat sealable, coextruded film of claim 1 wherein the heat sealant layer is lap sealable to the base layer.

12. A nonoriented, heat sealable, coextruded film not thicker than 2 mil and having a base layer between two outer layers wherein:
- the base layer is selected from the group consisting of polyesters, copolyester and combinations thereof; and
- the two outer layers are heat sealant layers comprising a copolyester having a melting temperature below that of the base layer.

13. The nonoriented, heat sealable, coextruded film of claim 12 wherein:
- the base layer comprises from about 50% to about 99% mil/mil of the total thickness of the nonoriented, heat sealable, coextruded film; and
- the heat sealant layers comprise from about 1% to about 50% mil/mil of the total thickness of the nonoriented, heat sealable, coextruded film.

14. The nonoriented, heat sealable, coextruded film of claim 13 wherein:
- the base layer comprises from about 75% to about 95% mil/mil of the total thickness of the nonoriented, heat sealable coextruded film; and
- the heat seal layers comprise from about 5% to about 25% mil/mil of the total thickness of the nonoriented, heat sealable film.

15. The nonoriented, heat sealable, coextruded film of claim 13 coextruded by a cast coextrusion technique.

16. The nonoriented, heat sealable, coextruded film of claim 13 coextruded by a blown film nonorienting coextrusion technique.

17. The nonoriented, heat sealable, coextruded film of claim 13 wherein the heat sealant layers contain a slip agent and an antiblock agent.

18. The nonoriented, heat sealable, coextruded film of claim 17 wherein:
- the slip agent is an organic silicone; and
- the antiblock is an inorganic diatomaceous earth.

19. The nonoriented, heat sealant, coextruded film of claim 13 wherein the copolyester of the heat sealant layers is selected from the group consisting of diethylene glycol copolyester and PETG copolyester wherein:
- diethylene glycol copolyester is chemically defined as poly(ethylene-codiethylene terephthalate) and;
- PETG copolyester is chemically defined as poly-(ethylene-1,4-cyclohexylene-dimethylene terephthalate).

20. The nonoriented, heat sealable, coextruded film of claim 13 wherein
- the base layer comprises PCTA copolyester; and
- PCTA copolyester is chemically defined as poly(1,4-cyclohexane dimethylene terephthalate-co-isophthalate).

21. The nonoriented, coextruded film of claim 13 wherein the heat sealant layers are differentially heat sealable utilizing a fusion seal made at high temperatures for a storing seal and a peelable seal made at lower temperatures for weaker seals.

22. A method of producing a non-oriented, heat sealable, coextruded film comprising:
- placing a base layer resin selected from the group consisting of polyester, copolyester and combinations thereof into a first extruder;
- placing a heat sealant layer resin comprising copolyester having a melting temperature below that of the base layer resin into a second extruder; and
- coextruding the base layer resin from the first extruder and the heat sealant layer resin from the second extruder through a coextrusion feedblock having a cast film die to produce the non-oriented, heat sealable, coextruded film not thicker than 2 mil.

23. The method of claim 22 having an additional step of quenching the nonoriented, heat sealable coextruded film utilizing a chilled roll.

24. A method of producing a non-oriented, heat sealable, coextruded film comprising:
- placing a base layer resin selected from the group consisting of polyester, copolyester and combinations thereof into a first extruder;
- placing a heat sealant layer resin consisting of copolyester having a melting temperature below that of the base layer resin into a second extruder; and
- coextruding the base layer resin from the first extruder and the heat sealant layer resin from the second extruder through a two layer spiral coextrusion blown film die to produce the non-oriented, heat sealable, coextruded film not thicker than 2 mil.

25. The method of claim 24 having an additional step of cooling the nonoriented, heat sealable coextruded film utilizing blown film cooling methods.

26. A method of producing a non-oriented, heat sealable, coextruded film having a base layer between two outer layers wherein the two outer layers are heat sealant layers comprising:
- placing a base layer resin selected from the group consisting of polyester, copolyester and combinations thereof into a first extruder;
- placing a heat sealant layer resin comprising copolyester having a melting temperature below that of the base layer resin into a second extruder; and
- coextruding the base layer resin from the first extruder and the heat sealant layer resin from the second extruder through a coextrusion feedblock having a cast film die wherein the heat sealant resin is split into a first and a second stream to produce the non-oriented, heat sealable, coextruded film not thicker than 2 mil and having the base layer between the two heat sealant layers.

27. The method of claim 26 having an additional step of quenching the nonoriented, heat sealable, coextruded film having the base layer between two heat sealant layers utilizing a chilled roll.

28. A method for producing a non-oriented, heat sealable, coextruded film having a base layer between two outer layers wherein the two outer layers are heat sealant layers comprising:
- placing a base layer resin selected from the group consisting of polyester, copolyester and combinations thereof into a first extruder;
- placing a heat sealant layer resin comprising copolyester having a melting temperature below that of the base layer resin into a second extruder; and
- coextruding the base layer resin from the first extruder and the heat sealant layer resin from the second extruder through a three layer spiral coextrusion blown film die, having a center spiral channel and inside and outside spiral channels wherein the base layer resin is extruded into the center spiral channel and the heat sealant layer resin is split and extruded into the inside and outside spiral channels to produce the non-oriented, heat sealable, coextruded film not thicker than 2 mil and having the base layer between the two heat sealant layers.

29. The method of claim 28 having an additional step of cooling the nonoriented, heat sealable, coextruded film having the base layer between two heat sealant layers utilizing blown film cooling techniques.

30. A laminate sheet comprising:
   a first substrate comprising a non-oriented, heat sealable, coextruded film not thicker than 2 mil and having a base layer and a heat sealant layer wherein the base layer is selected form the group consisting of polyester, copolyester and combinations thereof and the heat sealant layer comprises a copolyester having a melting temperature below that of the base layer; and
   a second substrate adhesively laminated to the first substrate.

31. The laminate sheet of claim 30 wherein;
   the second substrate is selected from the group consisting of a paper and a film; and
   the film of the second substrate is not the same as the first substrate.

32. The laminate sheet of claim 30 wherein the non-oriented, heat sealable, coextruded film further comprises an additional heat sealant layer having a melting temperature below that of the base layer and wherein the base layer is between the heat sealant layers.

33. A laminate bag comprising:
   a non-oriented, heat sealable, coextruded film not thicker than 2 mil and having a base layer and heat sealant layer wherein the base layer is selected from the group consisting of polyester, copolyester and combinations thereof and the heat sealant layer comprises a copolyester having a melting temperature below that of the base layer; and
   a paper lamina having the non-oriented, heat sealable, coextruded film adhesively laminated to the paper lamina to form a laminate sheet wherein the laminate sheet is formed into the laminate bag having a predetermined size.

34. The laminate bag of claim 33 wherein the non-oriented, heat sealable, coextruded from further comprises an additional heat sealant layer having a melting temperature below that of the base layer and wherein the base layer is between the heat sealant layers.

35. The laminate bag of claim 33 having a predetermined amount of a consumable food is disposed inside the laminate bag.

36. The laminate bag of claim 35 wherein the bag includes a peelable seam of a predetermined strength to allow steam and pressure from cooking the consumable food utilizing a microwave oven to escape from a closed laminate bag through the peelable seam.

37. The laminate bag of claim 36 wherein the consumable food is popping corn.

38. The laminate bag of claim 36 wherein the consumable food is frozen.

39. A method of producing a laminate sheet comprising:
   adhesively laminating to a second substrate a first substrate comprising a non-oriented, heat sealable, coextruded film not thicker than 2 mil and having a base layer and a heat sealant layer wherein the base layer is selected from the group consisting of polyester, copolyester and combinations thereof and wherein the heat sealant layer comprises a copolyester having a melting temperature below that of the base layer.

40. The method of claim 39, wherein:
   the second substrate is selecteld from the group consisting of a paper and a film; and
   the film of the second substrate is not the same as the first substrate.

41. The method of claim 39 wherein the film of the first substrate further comprises an additional heat sealant layer having a melting temperature below that of the base layer and wherein the base layer is between the heat sealant layers.

42. A method of producing a laminate bag comprising:
   forming a laminate sheet by adhesively laminating to a paper lamina a non-oriented, heat sealable, coextruded film not thicker 2 mil and having a base layer and a heat sealant layer wherein the base layer is selected from the group consisting of polyester, copolyester and combinations thereof and wherein the heat sealant layer comprises a copolyester having a melting temperature below that of the base layer; and
   forming the flat laminate sheet into the laminate bag having a predetermined size.

43. The method of claim 42 wherein longitudinal seams are formed by heat sealing by fusion of film to film.

44. The method of claim 42 wherein longitudinal seams are formed by gluing paper lamina to paper lamina.

45. The method of claim 42 wherein longitudinal seams are formed by gluing film to paper lamina.

46. The method of claim 42 wherein:
   a predetermined amount of a consumable food is disposed inside the laminate bag;
   the laminate bag is closed; and
   the laminate bag is peelably sealed.

47. The method of claim 46 wherein the peelable seal of the peelably sealed laminate bag has a predetermined strength to allow steam and pressure from cooking the consumable food to escape from the laminate bag through the peelable seal.

48. The method of claim 42 wherein the coextruded film further comprises an additional heat sealant layer having a melting temperature below that of the base layer and wherein the base layer is between the heat sealant layers.

49. A method for cooking a predetermined amount of a consumable food in a closed laminate bag having a peelable seal of a predetermined strength comprising:
   disposing the consumable food inside the laminate bag;
   sealing the laminate bag to form a closed laminate bag wherein the closed laminate bag comprises a paper lamina adhesively laminated to a non-oriented, heat-sealable, coextruded film not thicker than 2 mil and having a base layer and a heat sealant layer wherein the base layer is selected from the group consisting of polyester, copolyester and combinations thereof and wherein the heat sealant layer comprises a copolyester having a melting temperature below that of the base layer;
   placing the closed laminate bag in a microwave oven;
   cooking the consumable food for predetermined period of time at a predetermined setting such that steam and pressure from cooking the consumable food can escape from the laminate bag through the peelable seal; and
   removing the laminate bag from the microwave oven.

50. The method of claim 49 wherein the coextruded film further comprises an additional heat sealant layer having a melting temperature below that of the base layer and wherein the base layer is between the heat sealant layers.

51. The method of claim 49 wherein the consumable food is popping corn.

52. The method of claim 49 wherein the consumable food is frozen.

* * * * *